(12) United States Patent
Wang

(10) Patent No.: US 11,958,517 B2
(45) Date of Patent: Apr. 16, 2024

(54) INTELLIGENT TRAIN OPERATION ADJUSTMENT SYSTEM AND METHOD BASED ON REAL-TIME PASSENGER FLOW

(71) Applicant: CASCO SIGNAL CO., LTD., Shanghai (CN)

(72) Inventor: Xiaoyong Wang, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 895 days.

(21) Appl. No.: 16/977,563

(22) PCT Filed: Mar. 15, 2019

(86) PCT No.: PCT/CN2019/078245
§ 371 (c)(1),
(2) Date: Sep. 2, 2020

(87) PCT Pub. No.: WO2019/184724
PCT Pub. Date: Oct. 3, 2019

(65) Prior Publication Data
US 2021/0001906 A1    Jan. 7, 2021

(30) Foreign Application Priority Data
Mar. 30, 2018  (CN) .......................... 201810287834.3

(51) Int. Cl.
*B61L 27/00* (2022.01)
*B61L 27/16* (2022.01)
(Continued)

(52) U.S. Cl.
CPC ............... *B61L 27/16* (2022.01); *B61L 27/40* (2022.01); *G06Q 30/0201* (2013.01); *G06Q 50/30* (2013.01); *B61L 27/12* (2022.01)

(58) Field of Classification Search
CPC .......... B61L 27/12; B61L 27/16; B61L 27/40; G06Q 30/0201; G06Q 50/30
(Continued)

(56) References Cited

U.S. PATENT DOCUMENTS 7,188,057 B2 *  3/2007  Birkelbach ............ G05B 17/02
                                                                 701/19
8,195,387 B2 *  6/2012  Moritz .................. B60Q 1/085
                                                                348/148
(Continued)

FOREIGN PATENT DOCUMENTS

CN       201023495 Y      2/2008
CN       102044149 Y      5/2011
(Continued)

OTHER PUBLICATIONS

International Search Report (in English and Chinese) and Written Opinion issued in PCT/CN2019/078245, dated Jun. 19, 2019, 12 pages provided.

*Primary Examiner* — Andrew Joseph Rudy
(74) *Attorney, Agent, or Firm* — HSML P. C.

(57) ABSTRACT

The present invention relates to an intelligent train operation adjustment system and method based on real-time passenger flow. The system includes a real-time passenger flow counting module, a real-time passenger flow and transport capacity matching module, and an intelligent train operation (Continued)

adjustment module, the real-time passenger flow counting module counts current real-time passenger flow and inputs the current real-time passenger flow into the real-time passenger flow and transport capacity matching module, the real-time passenger flow and transport capacity matching module matches a current passenger flow demand with a current transport capacity of a line, and the intelligent train operation adjustment module adjusts a working diagram in real time based on the real-time passenger flow and an operation result of the matching module, and adds or removes a train and arranges a path plan for the train with reference to a dispatching plan and device information. Compared with the prior art, the present invention has the following advantages: quick, flexible, and accurate.

8 Claims, 2 Drawing Sheets

(51) Int. Cl.
*B61L 27/40* (2022.01)
*G06Q 30/0201* (2023.01)
*G06Q 50/30* (2012.01)
*B61L 27/12* (2022.01)

(58) Field of Classification Search
USPC .......................................................... 701/117
See application file for complete search history.

(56) References Cited

U.S. PATENT DOCUMENTS

| 9,875,405 | B2 * | 1/2018 | Yu ........................... G06T 7/215 |
| 11,674,811 | B2 * | 6/2023 | Shoval ................... G06Q 10/02 |
| | | | 701/533 |
| 2015/0294430 | A1 | 10/2015 | Huang et al. |

FOREIGN PATENT DOCUMENTS

| CN | 103077605 A | 5/2013 |
| CN | 104157132 A | 11/2014 |
| CN | 104192177 A | 12/2014 |
| CN | 105046350 A | 11/2015 |
| CN | 105128894 A | 12/2015 |
| CN | 105882695 A | 8/2016 |
| CN | 106960564 A | 7/2017 |
| CN | 107399344 A | 11/2017 |
| CN | 107914740 A | 4/2018 |
| CN | 108082224 A | 5/2018 |
| CN | 108090668 A | 5/2018 |
| CN | 208233080 U | 12/2018 |
| EP | 2975561 A1 | 1/2016 |
| WO | 2014004302 A1 | 1/2014 |

* cited by examiner

INTELLIGENT TRAIN OPERATION ADJUSTMENT SYSTEM AND METHOD BASED ON REAL-TIME PASSENGER FLOW

FIELD OF TECHNOLOGY

The present invention relates to the field of train operation management, and in particular, to an intelligent train operation adjustment system and method based on real-time passenger flow.

BACKGROUND

In a current train operation management system, dispatchers manually determine, based on reports from station personnel or videos, whether trains need to be added or removed, and manage the trains by using different planned working diagrams. A manual reliance degree is extremely high and adjustments are often not timely and inaccurate, thereby aggravating mismatch between passenger flow and a transport capacity, and easily causing congestion in public places.

After searching, the Chinese patent with the publication number CN104192177B discloses a method for automatically adjusting operation of urban rail transit trains based on discrete event model. Based on this invention, the train operation adjustment system is considered as a discrete event system, and formal modeling is performed on the system. A total delay time of trains and a quantity of delayed trains are used as indicators to make decisions and choose different adjustment methods to adjust the trains. A dispatcher selects an adjustment mode according to a prompt at a workstation HMI and informs a train operation adjustment system of information of the selected adjustment mode by using JSON format data. The train operation adjustment system uses a message subscription mechanism and obtains an arrival event and a departure event of an online train by using a CORBA. A train arrival or departure event triggers the system to quickly recover train operation to a normal and orderly state based on the specified adjustment mode. This invention is aimed at adjusting a train stop time at a platform and an interval operation level when a train in operation deviates, so that the train can restore operation as soon as possible according to a scheduled timetable. However, this invention cannot resolve a problem that trains need to be added or removed as station personnel change.

SUMMARY

To overcome the disadvantages in the prior art, an objective of the present invention is to provide an intelligent train operation adjustment system and method based on real-time passenger flow.

The objective of the present invention may be implemented by using the following technical solutions.

An intelligent train operation adjustment system based on real-time passenger flow is provided, where the system includes a real-time passenger flow counting module, a real-time passenger flow and transport capacity matching module, and an intelligent train operation adjustment module, the real-time passenger flow counting module counts current real-time passenger flow and inputs the current real-time passenger flow into the real-time passenger flow and transport capacity matching module, the real-time passenger flow and transport capacity matching module matches a current passenger flow demand with a current transport capacity of a line, and the intelligent train operation adjustment module adjusts a working diagram in real time based on the real-time passenger flow and an operation result of the matching module, and adds or removes a train and arranges a path plan for the train with reference to a dispatching plan and device information.

Preferably, the real-time passenger flow counting module includes a video counting module, a train weighing module, and an AFC counting module.

Preferably, the video counting module includes a video-based platform people counting unit, a video-based station hall people counting unit, a video-based entrance/exit people counting unit, a video-based interchange people counting unit, and a video-based coach people counting unit.

Preferably, each of a video-based platform people counting unit, a video-based station hall people counting unit, and a video-based entrance/exit people counting unit includes an external camera and an external video identification and analysis server that are mutually connected.

Preferably, the video-based coach people counting unit includes an on-board camera and an on-board video identification and analysis server that are mutually connected.

Preferably, data of the train weighing module and data of the video-based coach people counting unit are transmitted to the real-time passenger flow and transport capacity matching module in a train-ground wireless manner.

Preferably, the train weighing module includes a train TIMS and an on-board controller that are mutually connected, and the AFC counting module includes a gate and an AFC server that are mutually connected.

Preferably, the real-time passenger flow and transport capacity matching module further counts the current real-time passenger flow with reference to a historical trend analysis provided by a historical passenger flow database; and the real-time passenger flow and transport capacity matching module further determines, with reference to current device status information provided by a device information monitoring server, how to adjust the transport capacity.

Preferably, the intelligent train operation adjustment module includes: receiving a working diagram suggested by the real-time passenger flow and transport capacity matching module; sending the working diagram to an ATS application server for operation plan adjustment after a dispatcher workstation confirms the working diagram; and sending a final plan to a train for execution in a train-ground wireless manner.

A method for using the intelligent train operation adjustment system based on real-time passenger flow is provided, including the following steps:

step 1. performing analysis based on video-based people counts in a station hall, at an entrance and exit, and at an interchange, AFC data, and historical data, and estimating possible passenger flow on up and down platforms;

step 2. determining passenger flow on a platform based on the estimated situation in step 1 and video-based passenger flow on the station platform, and determining, based on information of passenger flow in coaches of a train that is to enter a station, whether a transport capacity meets a real-time requirement;

step 3. determining, based on device status information, whether large passenger flow is caused by a device fault, and determining whether an operation adjustment needs to be performed;

step 4. determining, based on a transport capacity determining situation and a device status, whether the current capacity needs to be increased or decreased; if the capacity needs to be increased, determining, based on a minimum system operation interval and a working diagram of a current in-service train, whether a condition for continuing increasing the capacity is met;

step 5. for a capacity decreasing request or a capacity increasing request with a capacity increasing condition, providing, by the system, a suggested working diagram for adjusting the transport capacity, and performing a real-time adjustment after a dispatcher confirms the suggested working diagram;

step 6. for a capacity increasing request without a capacity increasing condition, providing, by the system, a related prompt, providing, by operational staff, an advice on changing to another line or vehicle, and organizing people on the platform to evacuate; and step 7. after a transport capacity adjustment request is confirmed, checking, by the system, a dispatching plan and device status information; determining to wake up a train at an optimum location based on the capacity increasing request, and for the capacity decreasing request, providing a train that is suggested to withdraw from operation, a withdrawal path, and a sleep location.

Compared with the prior art, the present invention has the following advantages:

1. Accuracy of passenger flow identification can be effectively increased by using a passenger flow technology based on a video fusion AFC and train weighing, and in addition, a passenger flow section is effectively estimated with reference to a large quantity of historical data.

2. A transport capacity is accurately matched with passenger flow. A high-performance machine automatically matches section passenger flow with a currently planned transport capacity of the system in time, to determine whether a train needs to be added or removed, thereby improving efficiency compared with manual determining of a dispatcher.

3. Compared with a previous manual adjustment of a working diagram, the intelligent operation adjustment system increases a speed from self-maintenance to putting into operation, so that pressure of passenger flow can be relieved in time, and uncertainties caused by manual adjustment of the dispatcher is avoided.

DESCRIPTION OF THE EMBODIMENTS

Figure 1:
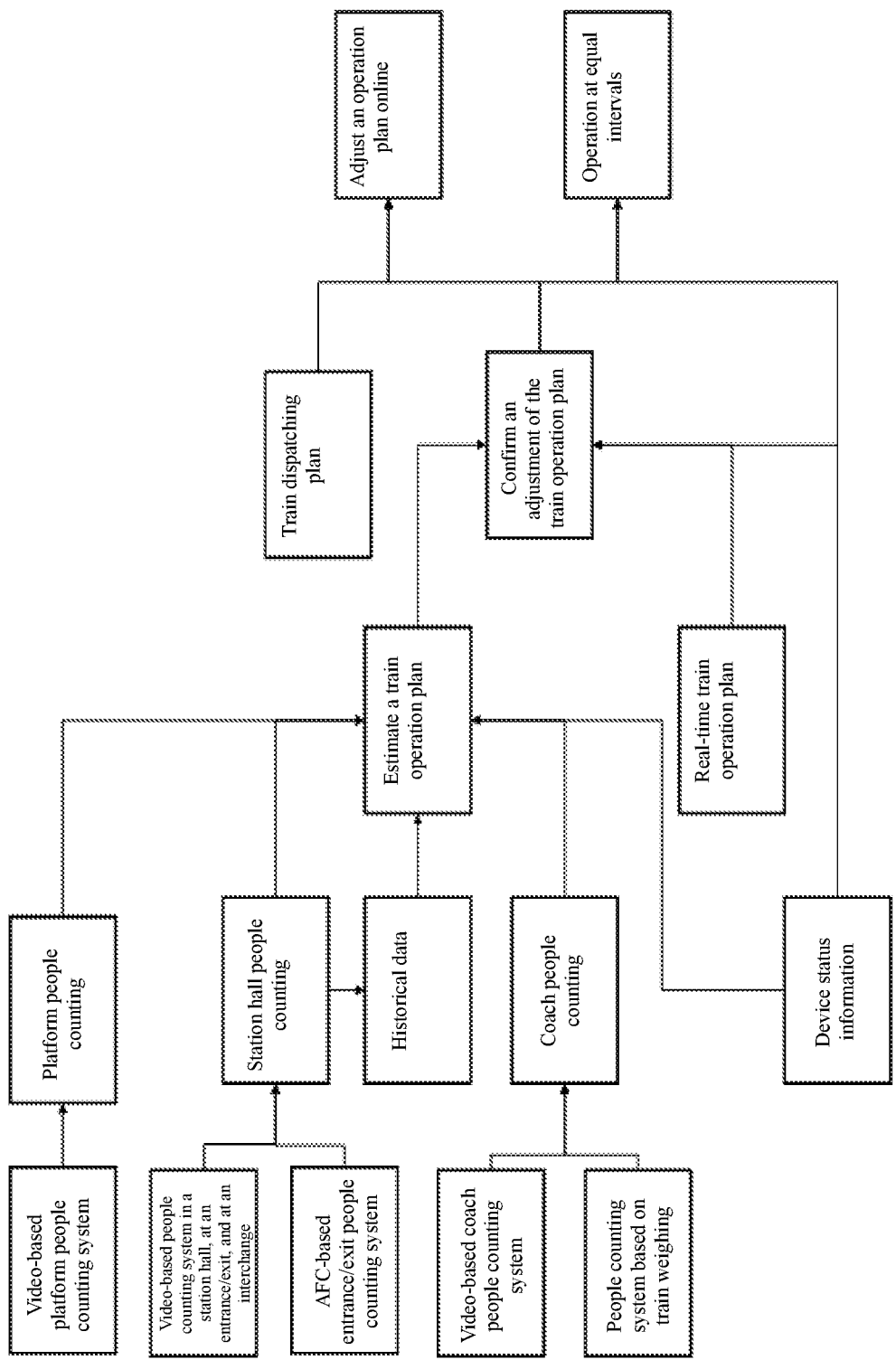
FIG. 1 is a block diagram of system functions according to the present invention.

The following clearly and completely describes the technical solutions in the embodiments of the present invention. Apparently, the described embodiments is some rather than all of the embodiments of the present invention. Based on the embodiments of the present invention, all the other embodiments obtained by those of ordinary skill in the art without inventive effort shall fall within the protection scope of the present invention.

The system mainly includes three parts: a real-time passenger flow counting system based on video counting, train weighing, and AFC, a real-time passenger flow and transport capacity matching system, and an intelligent train operation adjustment system. The real-time passenger flow counting system counts current real-time passenger flow based on video identification-counting information, train weighing information, AFC counting information, historical data, and the like. The real-time passenger flow and transport capacity matching system matches a current passenger flow demand with a current transport capacity of a line, and determines, with reference to a current device status, how to adjust the transport capacity. The intelligent train operation adjustment system adjusts a working diagram in real time based on the real-time passenger flow and an operation result of the matching system, and adds or removes a train and arranges a path plan for the train with reference to a dispatching plan and device information. A working procedure of the system is as follows:

① based performing analysis based on video-based people counts in a station hall, at an entrance and exit, and at an interchange, AFC data, and historical data, and estimating possible passenger flow on up and down platforms;

② based determining passenger flow on a platform based on the estimated situation in ③ and video-based passenger flow on the station platform, and determining, based on information of passenger flow in coaches of a train that is to enter a station, whether a transport capacity meets a real-time requirement;

③ determining, based on device status information, whether large passenger flow is caused by a device fault, and determining whether an operation adjustment needs to be performed;

④ determining, based on a transport capacity determining situation and a device status, whether the current capacity needs to be increased or decreased; if the capacity needs to be increased, determining, based on a minimum system operation interval and a working diagram of a current in-service train, whether a condition for continuing increasing the capacity is met;

⑤ for a capacity decreasing request or a capacity increasing request with a capacity increasing condition, providing, by the system, a suggested working diagram for adjusting the transport capacity, and performing a real-time adjustment after a dispatcher confirms the suggested working diagram;

⑥ for a capacity increasing request without a capacity increasing condition, providing, by the system, a related prompt, providing, by operational staff, an advice on changing to another line or vehicle, and organizing people on the platform to evacuate; and ⑦ after a transport capacity adjustment request is confirmed, checking, by the system, a dispatching plan and device status information; determining to wake up a train at an optimum location based on the capacity increasing request, and for the capacity decreasing request, providing a train that is suggested to withdraw from operation, a withdrawal path and a sleep location.

Figure 2:
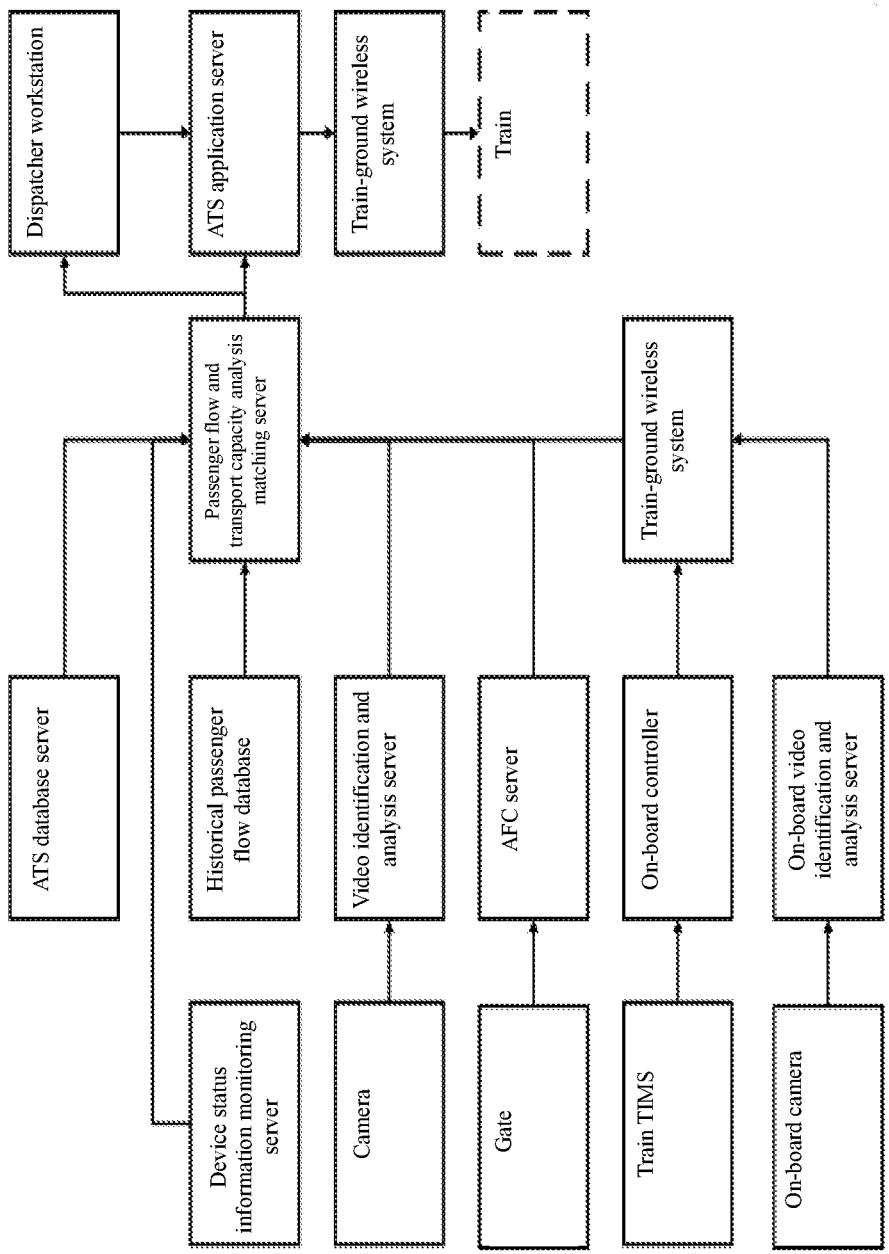
FIG. 2 is a schematic structural diagram of a system according to the present invention.

As shown in FIG. 2, the system mainly includes three parts: a real-time passenger flow counting system based on video counting, train weighing, and AFC, a real-time passenger flow and transport capacity matching system, and an intelligent train operation adjustment system. The real-time passenger flow counting system counts current real-time passenger flow based on video identification-counting information, train weighing information, AFC counting information, historical data, and the like. The real-time passenger flow and transport capacity matching system matches a current passenger flow demand with a current transport capacity of a line, and determines, with reference to a current device status, how to adjust the transport capacity. The intelligent train operation adjustment system adjusts a working diagram in real time based on the real-time passenger flow and an operation result of the matching system, and adds or removes a train and arranges a path plan for the train with reference to a dispatching plan and device information. Passenger flow counting and analysis include a fusion system composed of video identification and counting of a station and AFC, and a historical passenger flow database provides a historical trend analysis, and counted information is transmitted to a passenger flow and transport capacity analysis matching server. An on-board system includes TIMS weighing information and an on-board video identification and counting system, and on-board information is passed through an on-board controller and is transmitted to the passenger flow and transport capacity analysis matching server of a center in a train-ground wireless manner. The passenger flow and transport capacity analysis matching server further comprehensively considers device fault information provided by a device information monitoring server and then provides a suggestion for increasing or decreasing passenger flow. The suggestion is confirmed by a dispatcher workstation and is then sent to an ATS application server for operation plan adjustment, and a final plan is sent to a train for execution in a train-ground wireless manner.

In a project, a historical passenger flow database has been completed based on previous operating experience. After a station obtains large passenger flow data through video and AFC, whether the large passenger flow data is caused by a device fault or is an outstanding abnormal case on a day is determined based on the historical database and device status information, and a real-time passenger flow demand at this time is finally obtained. The on-board system obtains, through video and weighing, a remaining transport capacity of several trains approaching the station in a direction.

After the station and on-board information is sent to the passenger flow and transport capacity analysis matching server of the center, the server performs passenger flow estimation and real-time analysis of addition or removal in a transport capacity based on the information, and determines a train to be added or removed and a path of the train based on a train location in the database server. An analysis result is sent to the dispatcher workstation for confirmation by a dispatcher.

After the dispatcher performs confirmation, the suggested operation plan is adjusted into a current working diagram, and is sent to the on-board system by using a train operation command. The station performs a final operation adjustment on trains.

For an project instance, considering that the current project has been already equipped with devices related to video collection, AFC, train weighing, and ATS, and a train-ground wireless device, the system further needs to be equipped with at least several additional sets of video identification and counting servers and on-board video identification and counting servers (on each train), 1 set of historical passenger flow database, and 1 set of passenger flow and transport capacity analysis matching server. In addition, an interface between the train weighing system and an AFC system is increased.

In an intelligent working diagram adjustment system, when passenger flow does not match a transport capacity and a train needs to be added, a single trip may be added in an existing working diagram. The system prompts a dispatcher. After the dispatcher performs confirmation, an adjustment of the working diagram can be completed in about 30 seconds. At this time, if an operation interval meets a specific insertion condition, an instruction can be sent to a train immediately. The following cases exist.

1. If a station with sudden passenger flow is a train storage station, a train on a storage line is put into operation after 30 seconds, that is, when a working diagram is adjusted. Based on a station configuration and a time to up and low passenger platforms, a whole time is about 2 minutes.

2. When the station with sudden passenger flow is not the train storage station, using a project station configuration as an example, a train needs to move from the train storage station to a transport capacity increasing station, which costs about 3 minutes. In addition, an operation adjustment time is 30 seconds. Therefore, it takes 3.5 minutes to evacuate the passenger flow.

During specific operation, a train insertion situation and an online train operation situation can be further considered as required, and a path can be changed to adjust a transport capacity in a shorter time, thereby improving flexibility.

What is mentioned above is only the specific implementation of the present invention, but does not limit the protection scope of the present invention, and anyone skilled in the art can easily think of mortifications and alternations within the technical scope disclosed by the present invention, all of which should fall within the protection scope of the present invention. Therefore, the protection scope of the present invention should be determined by the protection scope of the claims.

What is claimed is:

1. An intelligent train operation adjustment system based on a real-time passenger flow, the system comprising:
   a real-time passenger flow counting module,
   a real-time passenger flow and transport capacity matching module, and
   an intelligent train operation adjustment module,
   wherein the real-time passenger flow counting module counts current real-time passenger flow and inputs the current real-time passenger flow into the real-time passenger flow and transport capacity matching module,
   the real-time passenger flow and transport capacity matching module matches a current passenger flow demand with a current transport capacity of a line and determines how to adjust a transport capacity based on current equipment status, and
   the intelligent train operation adjustment module adjusts a working diagram in real time based on the real-time passenger flow and an operation result of the matching module, and adds or removes a train and arranges a path plan with reference to a dispatching plan and device information,
   wherein the real-time passenger flow counting module comprises a video counting module, a train weighing module, and an Automatic Fare Collection (AFC) counting module,
   wherein the intelligent train operation adjustment module is configured to receive a working diagram suggested by the real-time passenger flow and transport capacity matching module; to send the working diagram to an Automatic Train Supervision (ATS) application server for operation plan adjustment after a dispatcher workstation confirms the working diagram; and to send a final plan to a train to execute in a train-ground wireless manner,
   wherein the real-time passenger flow counting module counts the current real-time passenger flow based on video identification-counting information, train weighing information, AFC counting information, and historical data.

2. The intelligent train operation adjustment system based on the real-time passenger flow according to claim 1, wherein the video counting module comprises a video-based platform people counting unit, a video-based station hall people counting unit, a video-based entrance/exit people counting unit, a video-based interchange people counting unit, and a video-based coach people counting unit.

3. The intelligent train operation adjustment system based on the real-time passenger flow according to claim 1, wherein each of a video-based platform people counting unit, a video-based station hall people counting unit, and a video-based entrance/exit people counting unit comprises an external camera and an external video identification and analysis server that are mutually connected.

4. The intelligent train operation adjustment system based on the real-time passenger flow according to claim 2, wherein the video-based coach people counting unit comprises an on-board camera and an on-board video identification and analysis server that are mutually connected.

5. The intelligent train operation adjustment system based on the real-time passenger flow according to claim 1, wherein data of the train weighing module and data of the video-based coach people counting unit are transmitted to the real-time passenger flow and transport capacity matching module in a train-ground wireless manner.

6. The intelligent train operation adjustment system based on the real-time passenger flow according to claim 2, wherein the train weighing module comprises a Train Information Management System (TIMS) and an on-board controller that are mutually connected, and the AFC counting module comprises a gate and an AFC server that are mutually connected.

7. The intelligent train operation adjustment system based on the real-time passenger flow according to claim 1, wherein the real-time passenger flow and transport capacity matching module further counts the current real-time passenger flow with reference to a historical trend analysis provided by a historical passenger flow database; and the real-time passenger flow and transport capacity matching module further determines, with reference to current device status information provided by a device information monitoring server, how to adjust the transport capacity.

8. A method for using the intelligent train operation adjustment system based on the real-time passenger flow according to claim 1, the method comprising:

A) performing analysis based on video-based people counts in a station hall, at an entrance and exit, and at an interchange, AFC data, and historical data, and estimating possible passenger flow on up and down platforms;

determining a passenger flow on a platform based on the possible passenger flow estimated in A) and video-based passenger flow on a platform of a train station, and determining, based on information of passenger flow in coaches of a train that is to enter a station, whether the transport capacity meets a real-time requirement;

determining, based on device status information, whether the passenger flow is caused by a device fault, and determining whether an operation adjustment needs to be performed;

determining, based on a transport capacity determining situation and a device status, whether current capacity needs to be increased or decreased; if a capacity needs to be increased, determining, based on a minimum system operation interval and a working diagram of a current in-service train, whether a condition for continuing increasing the capacity is met;

for a capacity decreasing request or a capacity increasing request with a capacity increasing condition, providing, by the intelligent train operation adjustment system, a suggested working diagram for adjusting the transport capacity, and performing a real-time adjustment after a dispatcher confirms the suggested working diagram;

for a capacity increasing request without a capacity increasing condition, i) providing, by the intelligent train operation adjustment system, a related prompt; ii) providing, by operational staff, an advice on changing to another line or vehicle; and iii) organizing people on the platform to evacuate; and checking, by the intelligent train operation adjustment system, a dispatching plan and device status information after a transport capacity adjustment request is confirmed; determining to wake up a train at an optimum location based on the capacity increasing request; and for the capacity decreasing request, providing 1) train that is suggested to withdraw from operation, 2) a withdrawal path, and 3) a sleep location.

\* \* \* \* \*